(12) United States Patent
Oberstarr

(10) Patent No.: US 6,869,380 B2
(45) Date of Patent: Mar. 22, 2005

(54) DRIVELINE FOR MOBILE-VEHICLES

(75) Inventor: Johann Gerhard Oberstarr, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/459,382

(22) Filed: Jun. 11, 2003

(65) Prior Publication Data

US 2004/0254043 A1 Dec. 16, 2004

(51) Int. Cl.$^7$ ................................................ F16H 3/44
(52) U.S. Cl. ..................... 475/323; 475/311; 475/317
(58) Field of Search ................................. 475/311, 317, 475/323; 192/221.1; 180/369, 370, 372; 188/18 A, 71.5, 218 XL

(56) References Cited

U.S. PATENT DOCUMENTS

| | | | |
|---|---|---|---|
| 2,776,583 A | 1/1957 | Williams | |
| 2,998,735 A | 9/1961 | Elfes | |

(List continued on next page.)

FOREIGN PATENT DOCUMENTS

| | | |
|---|---|---|
| DE | 2 328 929 | 12/1973 |
| DE | 21 51 192 | 4/1975 |
| DE | 23 57 451 | 5/1975 |
| DE | 29 07 138 | 8/1987 |
| DE | 38 32 649 | 7/1989 |
| DE | 38 36 457 | 5/1990 |
| DE | 39 05 292 | 8/1990 |
| DE | 40 11 022 | 10/1990 |
| DE | 42 06 087 | 9/1993 |
| DE | 43 00 445 | 7/1994 |
| DE | 195 23 543 | 1/1997 |
| DE | 196 21 197 A1 | 11/1997 |
| DE | 196 40 146 | 1/1998 |
| DE | 197 18 744 C1 | 11/1998 |
| DE | 100 63 100 A1 | 8/2001 |
| EP | 0 722 051 | 7/1996 |
| EP | 0 979 365 | 7/2001 |
| EP | 1 234 993 | 8/2002 |
| FR | 2 350 520 | 12/1977 |
| FR | 2 641 232 | 7/1990 |
| GB | 2 043 186 | 10/1980 |
| GB | 2 089 741 | 6/1982 |
| GB | 2 220 178 | 1/1990 |
| JP | 07-269662 | * 10/1995 |
| JP | 2001-200874 | * 7/2001 |
| WO | WO 98/50714 | 11/1998 |

*Primary Examiner*—Ha Ho
(74) *Attorney, Agent, or Firm*—Davis & Bujold, P.L.L.C.

(57) ABSTRACT

A driveline for mobile vehicles comprising one multi-disc brake (14) which non-rotatably connects a rotatable part of a planetary transmission (12) with the housing (4) wherein the actuating device of the multi-disc brake has one piston (18) which has one automatic piston-resetting device (21), and clamping elements (22) are situated in holes (40) of the piston (18).

20 Claims, 2 Drawing Sheets

U.S. PATENT DOCUMENTS

| | | |
|---|---|---|
| 3,115,204 A | 12/1963 | Dence |
| 3,982,618 A | 9/1976 | Horsch |
| 4,159,657 A | 7/1979 | Stilley |
| 4,181,042 A | 1/1980 | Rau et al. |
| 4,424,874 A | 1/1984 | Koike et al. |
| 4,655,326 A | 4/1987 | Osenbaugh |
| 4,790,213 A * | 12/1988 | Lasoen ...................... 475/328 |
| 4,950,213 A | 8/1990 | Morisawa |
| 5,014,800 A | 5/1991 | Kawamoto et al. |
| 5,024,636 A | 6/1991 | Phebus et al. |
| 5,029,685 A * | 7/1991 | Takase et al. ............ 192/48.91 |
| 5,064,530 A | 11/1991 | Duff et al. |
| 5,391,122 A | 2/1995 | Forster |
| 5,391,123 A | 2/1995 | Forster |
| 5,397,281 A | 3/1995 | Forster |
| 5,435,793 A | 7/1995 | Varela et al. |
| 5,509,864 A | 4/1996 | Hauser |
| 5,645,148 A | 7/1997 | Saurin et al. |
| 5,746,675 A | 5/1998 | Sugiyama |
| 6,090,006 A | 7/2000 | Kingston |
| 6,131,705 A | 10/2000 | Dahlen et al. |
| 6,290,048 B1 | 9/2001 | Kohlmeier et al. |
| 6,367,591 B1 | 4/2002 | Gosda |
| 6,530,859 B2 | 3/2003 | Boston et al. |
| 6,685,595 B2 * | 2/2004 | Ohkubo et al. ............. 475/319 |

* cited by examiner

DRIVELINE FOR MOBILE-VEHICLES

FIELD OF THE INVENTION

The invention concerns drivelines for mobile vehicles.

BACKGROUND OF THE INVENTION

According to the preamble, drivelines are especially used for mobile vehicles, for example, construction machinery such as loaders, in order to drive or brake the wheels of the vehicle. It is of particular importance that it is possible to operate the brake existing in said drivelines with a steady function.

U.S. Pat. No. 6,090,006 discloses a driveline for mobile vehicles having a planetary transmission in which the rotating inner discs of a multi-disc brake are located on the radially outer area of the planet carrier whereby, when the multi-disc brake is actuated in closing direction, the planet carrier becomes non-rotatably connected with the housing. To ensure a steady air play of the discs, the actuating device of the multi-disc brake has an automatic piston-resetting device. For this purpose, blind holes are situated in the housing in which engage clamping elements, which upon actuation of the brake, are displaced so that when the multi-disc brake is actuated in an opening direction, the clutch play remains steady. This kind of resetting device requires an expensive processing of the housing and the spring elements are heavily loaded.

The problem on which this invention is based is to provide a driveline for mobile vehicles which stands out by a steady operation of the brake.

SUMMARY OF THE INVENTION

The driveline, according to the invention, has a planetary transmission, the rotary part of which is non-rotatably connected with the housing when the multi-disc brake is actuated in the closing direction. To maintain uniform air play of the discs when the multi-disc brake is actuated in the opening direction, even with increasing wear of the discs, an automatic resetting device is situated in the piston. For this purpose, the piston has at least one hole in which at least one clamping element is located which supports itself upon one washer. The washer is axially movable between two stops and freely rotatable in the radial direction. The clamping elements preferably lie exclusively upon the washer whereby the clamping elements undergo absolutely no additional forces acting in a peripheral direction so that it is possible to use for actuating the multi-disc brake and an annular piston which requires no protection against twisting in the housing. Since no additional forces which could generate, for example, by the rotation of the piston, act upon the clamping elements, a steady operation of the automatic resetting device is ensured. On the washer upon which rest the clamping elements, tension of a recoil spring acts which forces back the piston when the multi-disc brake is actuated in the opening direction. But this is possible only as long as the washer abuts against its one stop. If the piston is actuated in the closing direction, the piston moves in the axial direction whereby the clamping elements situated therein likewise move in the axial direction and displace the washer against the spring tension. This is possible only between the two stops of the washer so that when the other stop of the washer is reached, the piston does move further in the closing direction of the multi-disc brake, but the clamping element supports itself upon the washer which is against its stop and slides into the piston. When the multi-disc brake is again actuated in the opening direction, the piston, in turn, returns back from within the stop of the washer due to the tension of the recoil spring whereby the spacing of the discs remains uniform. By situating the automatic resetting device on the inner area of the piston, an automatic resetting device is provided which is economical, consists of few simple parts and is easy to assemble. Since the piston is not connected with the housing in the radial rotating direction via the resetting device, it is not necessary to provide expensive parts for absorbing peripheral forces.

BRIEF DESCRIPTION OF THE DRAWINGS

The invention will now be described, by way of example, with reference to the accompanying drawings in which.

DETAILED DESCRIPTION OF THE INVENTION

Figure 1:
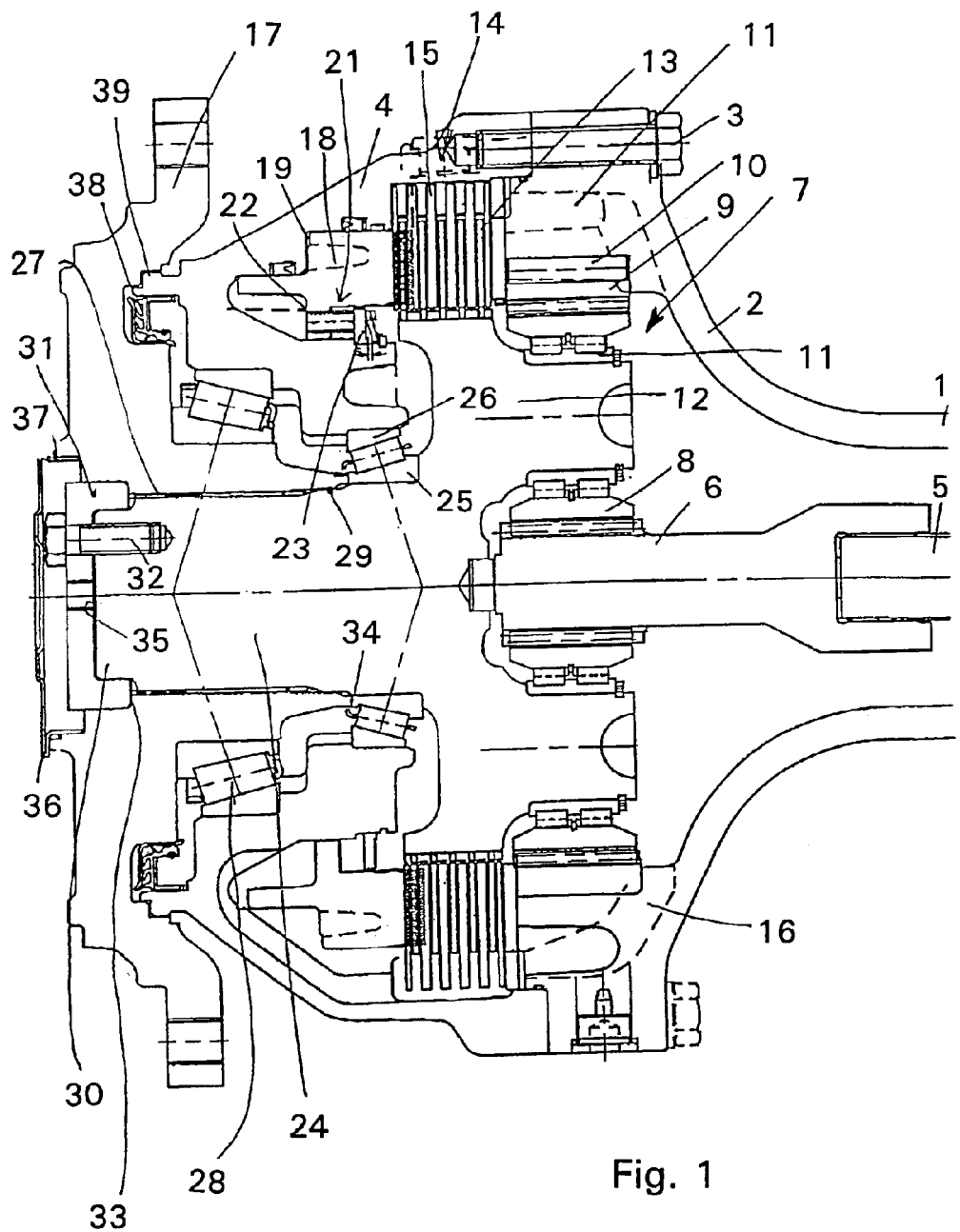
FIG. 1 shows a driveline for mobile vehicles having an automatic resetting device.
Figure 2:
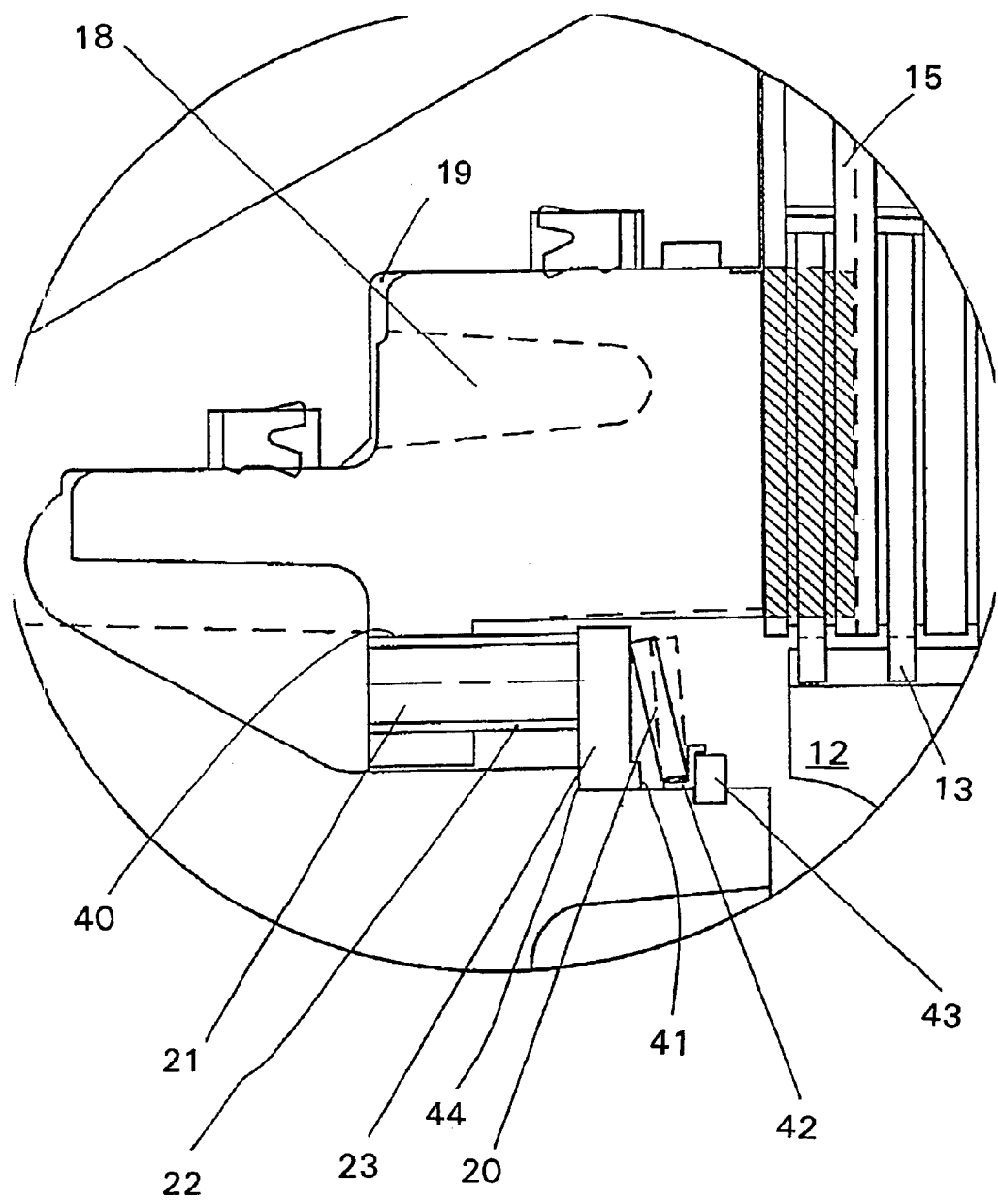
FIG. 2 shows detailed arrangement of the automatic resetting device.

FIG. 1:

It shows a section of one side of the drive axle with an axle pipe 1 which can be connected with the vehicle (not shown) and which has a funnel-shaped extension 2 which, via connecting elements 3, is connected with the housing 4. The input shaft 5 drives an inner central gear 6 of a planetary transmission 7 and can also be designed integral with the drive shaft. The input shaft is preferably connected with a differential (not shown). It is also possible to connect the input shaft with a prime mover, such as an electromotor or a hydromotor. The inner central gear 6 is in operative connection with the planetary gear 8, which planetary gear 8 supports itself on the outer central gear 9 which is non-rotatably held. The outer central gear 9 is preferably non-rotatably situated by means of bolts 10 in the funnel-shaped extension 2 of the housing 4. It is also possible to non-rotatably retain the outer central wheel 9 via a self-cutting toothing, a so-called "mouse toothing", in the funnel-shaped extension 2 or the housing 4. The planetary gear 8 is supported, via the planetary bearing 11, upon the planet carrier 12. The inner rotating discs 13, of the multi-disc brake 14, are non-rotatably disposed on the radial outer area of the planet carrier 12, adjacent the planetary gear 8. The outer discs 15 are non-rotatably located in the housing 4 or the funnel-shaped extension 2. While the inner discs 13 rotate, cooling of the brake 14 occurs due to the centrifugal acceleration of the lubricant since the lubricant enters 13 an outer area of the planet carrier 12 by the inner disc, flows through the multi-disc brake and, in the area where the outer discs 15 are non-rotatably related, exits again in axial direction out of the multi-disc brake 14 being able to flow back via ducts 16. The multi-disc brake 14 is preferably situated between the planetary gear 8 and the output flange 17. A piston 18 is located between the multi-disc brake 14 and the output flange 17 which actuates the multi-disc brake 14 in a closing direction when pressure is applied in the space 19. The piston 18, when not actuated, is forced back by a recoil spring 20. It is possible to allow the recoil spring 20 to act upon an automatic resetting device 21 situated in a radially inner area of the piston 18. In this resetting device, a clamping 22 is disposed in the piston 18 which acts upon a washer 23 which is axially displaceable within a defined path and the axial path is limited by stops on both sides. Since the automatic resetting device 21 is not fixed in the axial direction, it also is unnecessary to fix the piston 18 in the radial direction. The piston 18 and the resetting device are preferably in the area of the first and second bearings. The planet carrier 12 has one journal 24 in the direction of the output flange 17 upon whose surface is situated the inner ring 25 of the second bearing 26. The journal 24 is non-rotatably connected with the output flange 17 via a non-rotatable connection 27 such as a toothing or meander-shaped configuration of the surface or several bolts. Said non-rotatable connection 27 is located in a hole of the output flange 17. Since the non-rotatable connection 27 is situated in the hole of the output flange 17, its length can be optimally designed as required. The output flange 17 is supported in the housing 4 via a first bearing 28. The inner diameter of the first bearing 28 is preferably larger than the second bearing 26. A centering 29 is situated immediately adjacent the inner ring 25. The output flange 17 is centered upon the journal 24 via said centering 29. A bushing 31 is on the end of the journal 24, remote from the planetary gear 8, and centers the output flange 17 upon the journal 24. The output flange 17 is thus centered via the bushing 31 and the centering 29 upon the journal 24 whereby the first bearing 28 and the second bearing 26 experience optimal operating conditions, since the output flange 17 cannot tip against the planet carrier 12. The bushing 31 has a cup-shaped design and is braced, via connecting elements 32, in the direction of the journal 24, and the bushing 31, via its axial face 33, pressing the output flange 17 against the inner ring 25. Since the inner ring 25 abuts against the planet carrier 12, on one side, and against the axial surface 34 of the output flange 17, on the other side, the first bearing 28 and the second bearing 26 can be easily assembled without expensive adjustment work. It is thus possible to use so-called "set-right bearings". Since the bushing 31 and the connecting elements 32 are easily accessible from outside of the vehicle, the output flange 17 can be disassembled without removing the axle from the vehicle. Since only the first bearing 28 is on the output flange 17, the output flange 17 can be disassembled without a great expenditure of force. This is possible since the inner ring 25 remains upon the planet carrier 12. The bushing 31 can be easily disassembled by a pressing-off thread 35. For protection of the connecting elements 32 and for easy sealing, the output flange 17 is closed by a lid 36 with a seal 37. The output flange 17 is sealed relative to the housing 4 via a radial shaft seal ring 38, a so-called "cassette seal". In order to protect the seal 38 from pollution, the output flange 17 and the housing 4 are designed so that a labyrinth 39 generates.

FIG. 2:

On the radial inner area of the piston 18 at least one hole 40 in which the clamping sleeve 22 is situated. Several holes 40 and clamping sleeves 22 preferably are uniformly distributed. The hole 40 can be a blind hole, but preferably is a through hole. Due to the pressurizing of the space 19, if the piston 18 is moved in the closing direction of the brake 14, the clamping sleeve 22 is likewise moved along in the direction of motion of the piston. The clamping sleeve 22 supports itself upon the washer 23 but preferably is not connected therewith so as not to have to support any additional forces in the peripheral direction. Due to the movement of the piston 18 and of the clamping sleeve 22, the washer 23 is likewise moved against the tension of the spring 20 until the washer abuts with its stop 41. The spring 20 is preferably fixed, in the axial direction, upon a guard ring 43 via a stop section 42. In the embodiment shown, the washer 23 moves until the stop 41 abuts against the spring 20. But other practical stops can also be used. If the washer 23 abuts with its stop 41 against the spring 20, but the piston 18 still has not completely compressed the multi-disc brake 14, and the piston 18 thus moves further until complete closing of the multi-disc brake 14 whereby the clamping sleeve 22 slides in the hole 40. If the pressure in the space 19 is reduced from the state of the completely closed multi-disc brake, then, below a defined pressure, the tension of the spring 20 begins to move the washer 23 and thus the clamping sleeve 22 and the piston 18 in the opening direction. The piston 18 is moved only until the washer 23 abuts against its stop 44. It is thus ensured that the play of the discs 13 and 15 remains the same in every closing state of the multi-disc brake 14.

REFERENCE NUMERALS 1 axle pipe
2 funnel-shaped extension
3 connecting elements
4 housing
5 input shaft
6 inner central gear
7 planetary transmission
8 planetary gear
9 outer central gear]
10 bolt
11 bearing
12 planet carrier
13 inner discs
14 multi-disc brake
15 outer discs
16 ducts
17 output flange
18 piston
19 space
20 recoil spring
21 automatic resetting device
22 clamping sleeve
23 washer
24 journal
25 inner ring
26 second bearing
27 non-rotatable connection
28 first bearing
29 centering
30 end
31 bushing
32 connecting element
33 axial surface
34 axial surface
35 pressing-off thread
36 lid
37 seal
38 seal
39 labyrinth
40 hole
41 stop
42 stop section
43 guard ring
44 stop

What is claimed is:
1. A driveline for a mobile vehicle having one planetary transmission (7) in which a rotatable part of the planetary transmission (12) is connectable, via a multi-disc brake (14), with a non-rotatable housing (4),
wherein the multi-disc brake (14) is activatable in a closing direction by a piston which moves in an axial direction against tension of a spring (20), an automatic resetting device limits movement of a piston stroke of the piston when the multi-disc brake (14) is actuated in an opening direction, and the automatic resetting device has at least one clamping element (22) which is situated in a hole (40) of the piston (18) and transmits axial force of the at least one clamping element (22) to a washer (23) which is displaceable along a defined path between first and second stops.

2. The driveline for a mobile vehicle according to claim 1, wherein the at least one clamping element (22) abuts against the washer (23).

3. The driveline for a mobile vehicle according to claim 1, wherein the spring (20) acts upon the piston (18) via the washer (23).

4. The driveline or a mobile vehicle according to claim 2, wherein the tension of the spring (20) is less than a clamping force of the at least one clamping element (22).

5. The driveline for a mobile vehicle according to claim 1, wherein the washer (23) is rotatable in a radial direction.

6. The driveline for a mobile vehicle according to claim 1, wherein the automatic resetting device is disposed within a racially inner area of the piston (18).

7. The driveline for a mobile vehicle according to claim 1, wherein the automatic resetting device is disposed between pressurized space (19) and a gear bearing (11) of the planetary transmission (7).

8. The driveline for a mobile vehicle according to claim 1, wherein the multi-disc brake (14) is situated in a radially outer area of a planet carrier (12) of the planetary transmission.

9. The driveline for a mobile vehicle according to claim 1, wherein a planet carrier (12) forms the drive output of the planetary transmission (12).

10. The driveline for a mobile vehicle according to claim 1, wherein the automatic resetting device is situated in an axial area of a wheel bearing and of a non-rotatable connection of one output flange (17) and one planet carrier (12)) of the planetary transmission (7).

11. The driveline for a mobile vehicle according to claim 1, wherein the piston (18) is an annular piston.

12. A driveline for a vehicle having a planetary transmission (7) with a planet carrier (12) of the planetary transmission (7) releaseably connectable, via a multi-disc brake (14), with a non-rotatable housing (4);

wherein the multi-disc brake (14) is activatable by axial movement of a piston in an engagement direction against a bias of a spring (20), an automatic resetting device limits return movement of the piston, and the automatic resetting device includes at least one clamping element (22) which is situated in a hole (40) of the piston (18) and transmits axial force of the at least one clamping element (22) to a washer (23) which is displaceable along a path between first and second stops.

13. The driveline for a vehicle according to claim 12, where the at least one clamping element (22) is movable along with the piston and abuts against the washer (23).

14. The driveline for a vehicle according to claim 12, wherein the spring (20) biases the piston (18) in the disengagement direction by acting upon the washer (23).

15. The driveline for a vehicle according to claim 12, wherein the bias of the spring (20) is less than a clamping force of the at least one clamping element (22).

16. The driveline for a mobile vehicle according to claim 12, wherein the washer (23) is movable relative to the at least one clamping element (22).

17. The driveline for a vehicle according to claim 12, wherein the automatic resetting device is disposed within a radially inward area of the piston (18).

18. The driveline for a vehicle according to claim 12, wherein the automatic resetting device is disposed between a pressurized space (19) and a gear bearing (11) of the planetary transmission (7).

19. The driveline for a vehicle according to claim 12, wherein the multi-disc brake (14) is situated in a radially outer area of the planet carrier (12) of the planetary transmission (7).

20. The driveline for a vehicle according to claim 12, wherein a planet carrier (12) forms the drive output of the planetary transmission (12); and the automatic resetting device is situated in a axial area of a wheel bearing between an output flange (17) of the planetary transmission (7) and the planet carrier (12) of the planetary transmission (7).

* * * * *